(12) United States Patent
Brown et al.

(10) Patent No.: US 11,767,829 B2
(45) Date of Patent: *Sep. 26, 2023

(54) METHODS FOR CONTROLLING SMA ACTUATORS

(71) Applicant: CAMBRIDGE MECHATRONICS LIMITED, Cambridge (GB)

(72) Inventors: Andrew Benjamin David Brown, Cambridge (GB); Daniel Burbridge, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/900,986

(22) Filed: Sep. 1, 2022

(65) Prior Publication Data

US 2022/0412326 A1 Dec. 29, 2022

Related U.S. Application Data

(63) Continuation of application No. 17/277,070, filed as application No. PCT/GB2019/052634 on Sep. 18, 2019, now Pat. No. 11,460,011.

(30) Foreign Application Priority Data

Sep. 18, 2018 (GB) ..................... 1815218

(51) Int. Cl.
*F03G 7/06* (2006.01)
*G01L 1/00* (2006.01)
*G12B 1/00* (2006.01)

(52) U.S. Cl.
CPC ............ *F03G 7/0665* (2021.08); *G01L 1/005* (2013.01); *G12B 1/00* (2013.01)

(58) Field of Classification Search
CPC ....... F03G 7/0665; F03G 7/065; G01L 1/005; G12B 1/00
USPC .............................. 60/527–529; 310/305–307
See application file for complete search history.

(56) References Cited

U.S. PATENT DOCUMENTS

| 4,579,006 A | 4/1986 | Hosoda et al. |
| 7,315,109 B1* | 1/2008 | Griffiths ................ H01L 41/042 310/800 |
| 11,460,011 B2* | 10/2022 | Brown .................. F03G 7/0665 |
| 2007/0175213 A1 | 8/2007 | Featherstone et al. |
| 2011/0277462 A1 | 11/2011 | Gregory et al. |
| 2016/0209670 A1 | 7/2016 | Brown et al. |

(Continued)

FOREIGN PATENT DOCUMENTS

| WO | 2009/071898 A2 | 6/2009 |
| WO | 2012/038703 A2 | 3/2012 |
| WO | 2014/076463 A1 | 5/2014 |

(Continued)

OTHER PUBLICATIONS

GB Search Report received for GB Application No. 1815218.1, dated Aug. 29, 2019.

(Continued)

*Primary Examiner* — Hoang M Nguyen
(74) *Attorney, Agent, or Firm* — Haley Guiliano LLP

(57) ABSTRACT

Broadly speaking, embodiments of the present techniques provide methods for driving shape memory alloy (SMA) actuator wires in a more power-efficient manner.

20 Claims, 6 Drawing Sheets

(56) References Cited

U.S. PATENT DOCUMENTS

2019/0120214 A1    4/2019  Brown et al.

FOREIGN PATENT DOCUMENTS

| WO | 2017/098249 A1 | 6/2017 |
| WO | 2017/134456 A1 | 8/2017 |
| WO | 2017/212262 A1 | 12/2017 |

OTHER PUBLICATIONS

International Search Report and Written Opinion received for PCT Patent Application No. PCT/GB2019/052634, dated Dec. 17, 2019.

* cited by examiner

METHODS FOR CONTROLLING SMA ACTUATORS

CROSS-REFERENCE TO RELATED APPLICATIONS

This application is a continuation of U.S. patent application Ser. No. 17/277,070, filed Mar. 17, 2021, which is a national stage application under 35 U.S.C. § 371 of International Application PCT/GB2019/052634, filed Sep. 18, 2019, which claims priority of GB Patent Application 1815218.1, filed Sep. 18, 2018. The disclosures of which are hereby incorporated by reference herein in their entireties.

The present application generally relates to techniques for controlling shape memory alloy (SMA) actuators, and in particular to techniques for controlling SMA actuators comprising opposed SMA wires.

According to a first aspect of the present invention, there is provided a method for controlling opposed SMA actuator wires that apply opposed forces to a moveable part, the method comprising:

carrying out closed-loop control of at least an aspect of the configuration of the movable part by driving each of the opposed wires, wherein the closed-loop control is carried out with a particular average drive signal that is an average of drive signals to all of the opposed wires; and increasing the average drive signal, thereby increasing the average power of the opposed wires, so as to increase a size of an allowable range of drive signals for at least one of the opposed wires.

Thus, the method can provide a more effective and/or power-efficient way of driving opposed SMA actuator wires.

The opposed forces may be such that the opposed wires can hold the moveable part in a fixed configuration. As will be appreciated, increasing the average power increases the average tension of the opposed wires.

The method may comprise: carrying out the control with an average drive signal closer to the lower bound of the allowable range than to the upper bound of the allowable range; and carrying out the control with an average drive signal that has been increased towards a midpoint of the allowable range.

The method may comprise carrying out the control in a low-power mode with an average drive signal that corresponds to a particular minimum average drive signal.

The method may comprise increasing the average drive signal in one or more particular conditions.

For example, increasing the average wire power (and tension) can improve performance in more demanding conditions.

The one or more conditions may correspond to one or more of the following:

A demand for a movement of the moveable part that requires differences between the drive signals that would otherwise reduce at least one of the drive signals below the lower bound of the allowable range of driving signals.

In other words, if the drive requested to one wire becomes negative then the mean drive can be increased by an amount that then allows the other wire(s) to be driven to their full requested drive without being clipped at the expense of changing the tension in the actuator.

A demand for a high speed and/or large movement of the movable part.

A change from a holding mode to an operating mode.

A closed-loop control error.

The method may comprise decreasing the average drive signal when the one or more conditions no longer exist.

The method may comprise limiting a rate of change of the average drive signal.

The upper bound of the allowable range of drive signals may be determined so as to protect against overheating of the at least one wire.

The upper bound may be determined based on a maximum power that can be supplied to the at least one wire at a given ambient temperature.

The method may comprise estimating the temperature of the at least one wire. The estimated wire temperature may be based on a history of power supplied to the wire. Carrying out the control may comprise keeping the estimated wire temperature between upper and lower limits. The method may comprise allowing the drive signal to the at least one wire to temporarily go above a maximum steady-state drive signal or go below a minimum stead-state drive signal.

Thus, the available rate of change of temperature can be increased (compared to an approach in which maximum or minimum steady-state drive signals are used) while maintaining protection of the SMA from excessive temperatures.

The lower bound of the allowable range of drive signals may be zero, or a relatively small drive signal, or a drive signal that maintains a suitable wire temperature for driving the wire (e.g. where the temperature-dependent of the strain and of the resistance of the wire is suitable).

The average drive signal may be changed as the ambient temperature changes.

There may be provided a controller configured to perform the method.

There may be provided apparatus comprising:
a moveable part;
opposed SMA actuator wires arranged to apply opposed forces to the moveable part; and
the controller, wherein the controller is configured to control the opposed wires.

The allowable range of driving signals may be the same or may be different for each of the opposed wires.

As will be appreciated, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present techniques also provide a non-transitory data carrier carrying code which, when implemented on a processor, causes the processor to carry out any of the methods described herein.

The present techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog® or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

It will also be apparent that all or part of a logical method according to embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements in for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

Certain embodiments of the present invention will now be described, by way of example only, with reference to the accompanying drawings, in which.

Broadly speaking, embodiments of the present techniques provide methods for driving shape memory alloy (SMA) actuator wires in a more power-efficient manner.

Shape memory alloy (SMA) actuators may be used to enable positional control of optical components (e.g. lenses) in cameras and miniature cameras, such as, for example, the cameras in smartphones/mobile devices. SMA actuators may be used to move lenses or lens stacks along the optical axis of a camera for focusing. An example of such an actuator is described in International Patent Publication No. WO2007/113478. SMA actuators may be used to move one or more components of a camera to enable image shake correction (e.g. optical image stabilisation, or OIS). An example of such an actuator is described in International Patent Publication No. WO2012/020212. In International Patent Publication No. WO2013/175197, an SMA actuator shifts a component of a camera in a direction orthogonal to the optical axis in order to provide image shake correction, while International Patent Publication No. WO2011/104518 describes an SMA actuator that is arranged to shift and rotate an optical component in all six spatial degrees of freedom.

Figure 1:
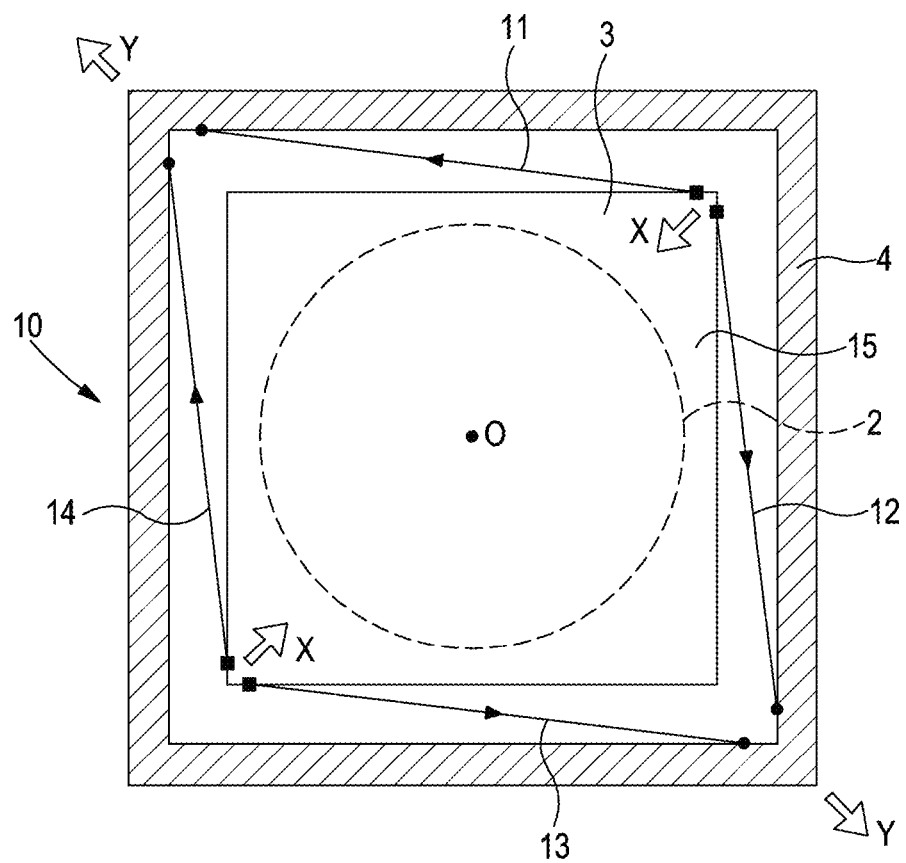
FIG. 1 is a plan view of an example arrangement of an SMA actuator.

In the actuation arrangement of WO2013/175197, also shown here as FIG. 1, an SMA actuation apparatus 10 moves a movable element 2 relative to a support structure 4 in two orthogonal directions using a total of four SMA wires 11-14. The SMA actuator wires 11-14 are arranged such that they are capable of being selectively driven to move the movable element 2 relative to the support structure 4 to any position, without applying any net torque to the movable element in the plane of the two orthogonal directions around a primary axis (e.g. optical axis O) of the apparatus. That is, the SMA actuator wires 11-14 enable positioning of the movable element 2 in two dimensions orthogonal to the primary axis and rotation of the movable element 2 about the primary axis. The positioning/rotation is achieved by varying the electrical power delivered to each of the four wires 11-14.

Specifically, each of the SMA actuator wires 11-14 is arranged along one side of the moveable element 2. The four SMA actuator wires 11-14 consist of a first pair of SMA actuator wires 11 and 13 arranged on opposite sides of the optical axis O, and a second pair of SMA actuator wires 12 and 14 arranged on opposite sides of the optical axis O. The first pair of SMA actuator wires 11 and 13 are capable of selective driving to move the moveable element 2 relative to the support structure 4 in a first direction in the plane, and the second pair of SMA actuator wires 12 and 14 are capable of selective driving to move the lens element 2 relative to the support structure 4 in a second direction in the plane transverse to the first direction. Movement in directions other than parallel to the SMA actuator wires 11 to 14 may be driven by a combination of actuation of these pairs of the SMA actuator wires 11 to 14 to provide a linear combination of movement in the transverse directions. Another way to view this movement is that simultaneous contraction of any pair of the SMA actuator wires 11 to 14 that are adjacent each other will drive movement of the moveable element 2 in a direction bisecting those two of the SMA actuator wires 11 to 14 (diagonally in FIG. 1, as labelled by arrows X and Y).

As a result, the SMA actuator wires 11 to 14 are capable of being selectively driven to move the moveable element 2 relative to the support structure 4 to any position in a range of movement in two orthogonal directions perpendicular to the optical axis O. The magnitude of the range of movement depends on the geometry and the range of contraction of the SMA actuator wires 11 to 14 within their normal operating parameters. The position of the moveable element 2 relative to the support structure 4 perpendicular to the optical axis O is controlled by selectively varying the temperature of the SMA actuator wires 11 to 14. This is achieved by passing through SMA actuator wires 11 to 14 selective drive currents that provides resistive heating. Heating is provided directly by the drive current. Cooling is provided by reducing or ceasing the drive current to allow the moveable element 2 to cool by conduction, convection and radiation to its surroundings. Techniques for controlling the wires are described in International Patent Publication No. WO2014/076463.

In WO2014/076463, an SMA actuation apparatus is described in which the SMA actuator wires are connected in tension between a movable element and a support structure and are arranged to apply forces to the movable element in opposed directions. Control of the SMA actuator wires is based on a resistance difference measure, that is, the difference in resistance among a set of SMA wires in tension against each another. Thus, measures of the resistances of the SMA actuator wires are detected. A feedback difference measure is derived, which is the sum of the measures of resistance of the SMA actuator wires, where the magnitude of the feedback difference measure represents a component of a force applied by the SMA actuator wire along a predetermined axis, and the sign of measure represents a direction along the predetermined axis. The powers of drive signals supplied to the SMA actuator wires are controlled in response to the feedback difference measure to reduce the difference between the feedback difference measure and a target difference measure. One technique to achieve this is to supply a bias power to all the SMA actuator wires to ensure they are all tensioned and, when movement of the movable element is required, supply additional power to one or more wires in the set while supplying less power to the remaining wires in the set. In this way, one or more wires contract and the other wires lengthen/extend, such that, while moving the movable element, the mean temperature of the set of wires remains constant and the tension remains approximately constant.

Figure 2:
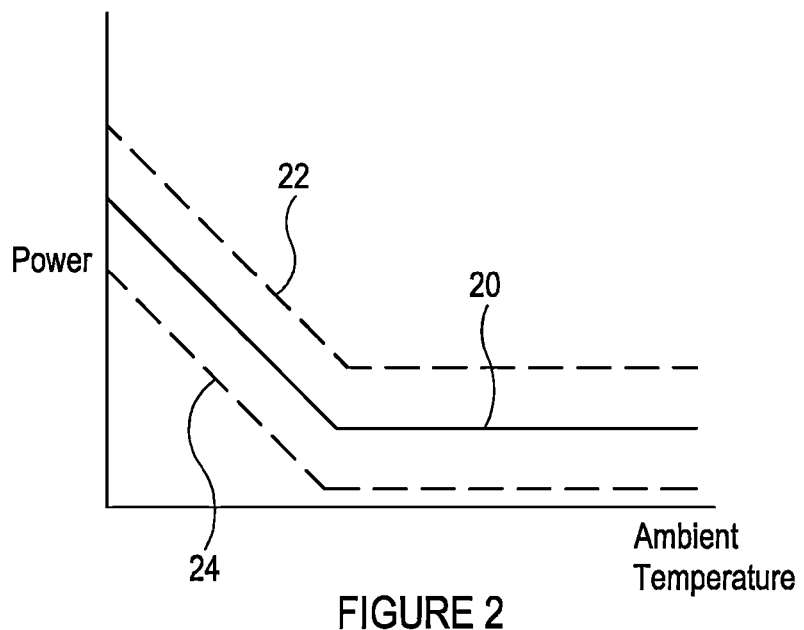
FIG. 2 is a graph of power against ambient temperature for an SMA actuator that is driven using a known control technique.

FIG. 2 is a graph of power against ambient temperature for an SMA actuator comprising at least two opposing wires that are driven using the techniques described in WO2014/076463. Here, the bias power 20 applied to the SMA actuator wires reduces from a high power at low ambient temperatures (e.g. room temperature and below), to a lower power for ambient temperatures around 40° C. or 50° C. When the ambient temperature is higher than say, 50° C., the bias power does not reduce further with temperature. Dashed line 22 represents an upper power bound and dashed line 24 represents a lower power bound, which respectively, correspond to the maximum and minimum allowable plus-and-minus powers provided to the two opposing wires. The upper bound 22 is selected to ensure an SMA wire is not damaged by being over-heated, while the lower bound 24 is selected such that the bias power 20 lies mid-way between the upper and lower bounds. At the higher temperatures, the lower bound 24 is at approximately zero power, or a little above zero to ensure the wire is active at all times (which may enable the resistance of the wire to be measured, for example).

As described in WO2014/076463, it may be advantageous to vary the bias power 20 in response to a measure of ambient temperature. At low ambient temperatures, considerable power must be supplied to bring the wires into the active transformation temperature range, which is typically around 70° C. At intermediate temperatures, less power is required, so the bias power 20 can be reduced, providing a power saving. However, as the ambient temperature increases further, say beyond 40° C., the bias power 20 cannot be reduced further as the wires need to be heated and cooled above the ambient temperature. At these temperatures, the rate at which the actuator can move is limited by the rate at which the wire can be cooled. The rate at which the wire cools is reduced if the wire has a lower temperature that results from a lower bias power. Similarly, if the bias power 20 is too low, the distance the actuator moves is reduced.

Embodiments of the present techniques provide methods for driving shape memory alloy (SMA) actuator wires in a more power-efficient manner, which take into account the temperature of the wires but avoid limiting the actuator movement capability. The methods described below with reference to FIGS. 3 to 7 apply to any SMA actuator comprising at least two SMA actuator wires that are connected in tension between a moveable component and a support structure/static component, and are arranged to apply forces to the moveable component in opposite directions. (That is, the wires are opposing wires). Generally speaking, the methods described below enable the average power supplied to opposing wires to be increased at any time when high amplitude, high speed or high slew rate is required. For example, the average power provided to the opposing wires may be increased to enable a rapid change in the position of the moveable component to be achieved. At other times, the average power may be reduced to or held at a lower level. This enables the moveable component to be moved across its full available range of motion in a power efficient manner.

Therefore, the present techniques provide a method for controlling opposed shape memory alloy (SMA) actuator wires in an actuation apparatus, where the opposed SMA actuator wires are connected between a static component and a moveable component in an arrangement in which the SMA actuator wires apply forces to the moveable component in opposed directions, the method comprising: generating instructions to control the average power of the opposed wires in a first low power state in which the opposed wires are at a first average temperature; receiving instructions to move the moveable component; and generating instructions to increase the average power of the opposed wires and switch into a second higher power state in which the opposed wires are at a second average temperature, where the second average temperature is higher than the first average temperature. The present techniques may be used to drive SMA wires in any actuator in which SMA wires act in opposition to each other (i.e. any actuator comprising opposed SMA wires).

Figure 4:
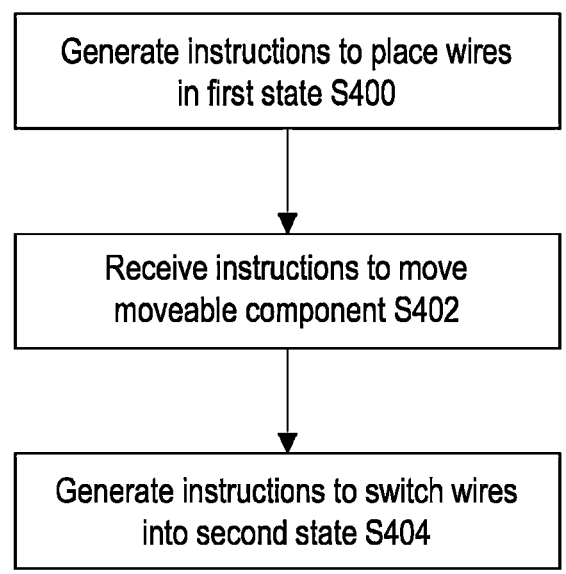
FIG. 4 is a flowchart showing general steps to control/drive the SMA actuator.

FIG. 4 is a flowchart showing general steps to control/drive an SMA actuator comprising at least two opposed SMA actuator wires. The steps may be implemented by at least one processor used to control the SMA actuator, or may be implemented by control circuitry, or a combination of both.

The process begins at step S400 by generating instructions to place the opposing wires into a first state. The first state is a low average power or low average temperature state, where the average is the mean value for the opposing wires. The first state may be predefined in embodiments. Once the opposing wires have entered the first state, the wires are maintained in the first state until instructions to move the moveable component are received.

The process continues at step S402 by receiving instructions to move the moveable component. The instructions may comprise data indicating where the moveable component is to be moved to, or this may be derivable from other data in the instructions. If the instructions indicate a large movement of the moveable component is required and/or that the moveable component is to be moved quickly, the power applied to at least one of the opposing wires needs to be increased in order to drive the movement. Thus, at step S404 the process comprises generating instructions to switch the wires into a second state, in which at least one of the opposing wires is driven with a higher power. Once the opposing wires have entered the second state, the wires are maintained in the second state until instructions to return the moveable component to the first state (i.e. the default 'hold' state) are received.

Three example approaches to implementing this general method are now described.

Figure 3:
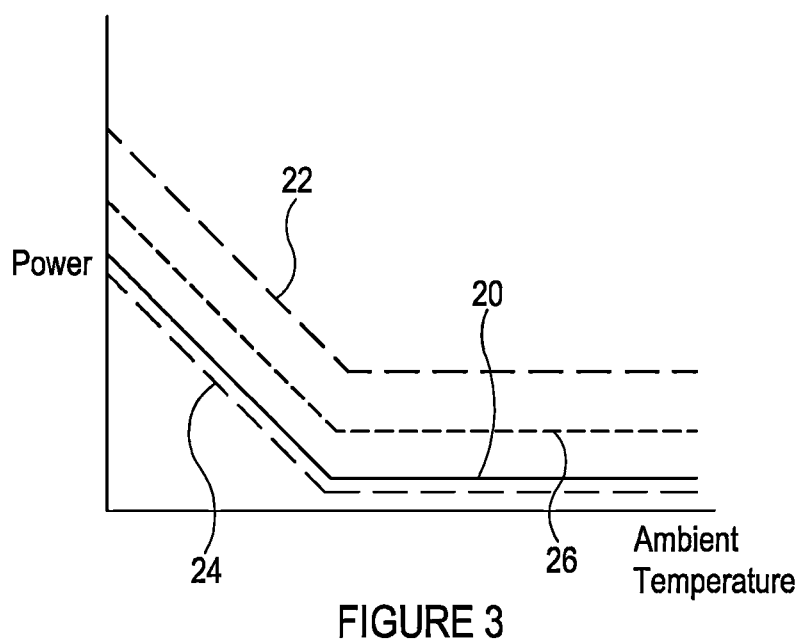
FIG. 3 is a graph of power against ambient temperature for an SMA actuator that is driven using a first technique.
Figure 5:
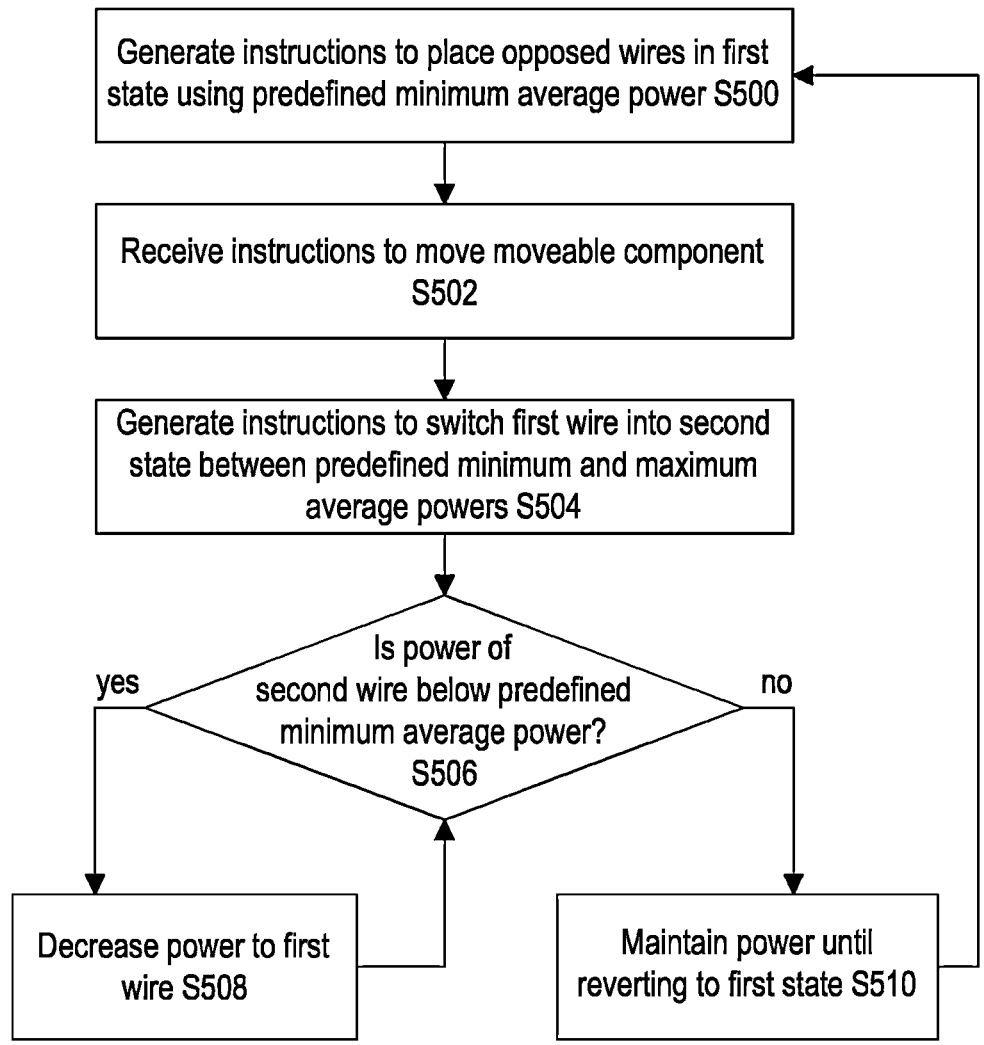
FIG. 5 shows a flowchart of example steps to drive an SMA actuator using the first technique.

FIG. 5 shows a flowchart of example steps to drive an SMA actuator using the first technique. The steps may be implemented by at least one processor used to control the SMA actuator, or may be implemented by control circuitry, or a combination of both. The process begins at step S500 by generating instructions to place the opposed wires into a first state using a predefined minimum average (e.g. mean) power. In this method, a minimum average power, a maximum average power, and a mid-point between the minimum and maximum average powers are predefined. FIG. 3 is a graph of power against ambient temperature for an SMA actuator that is driven using this method. Relative to FIG. 2, the bias power 20 is now closer to the lower power bound (i.e. the minimum average power) 24 than to the upper power bound (i.e. the maximum average power) 22. The mid-point between the upper and lower power bounds is indicated by the dotted line 26. If a high slew rate or high amplitude is demanded, the bias power may be increased by the amount necessary to meet the demand.

In this method therefore, the bias power 20 is between the minimum power 24 and the maximum power 22, but closer to the minimum power 24. When no individual wire power requires more than the minimum power (i.e. when the actuator is holding a centre position), the bias power is applied to all the wires. For small changes in position of the moveable component or slow changes/small slew rates, the average power applied to the opposing wires remains the bias power because large power differences between the opposing wires are not required. For larger changes in position of the moveable component or quicker changes/higher slew rates, a larger power difference between the opposing wires is required. Thus, compared to the technique shown in FIG. 2, here, the first state is closer to the minimum average power 24 than to the mid-point 26 and to the maximum average power 22. Advantageously, the method consumes less power and is more power efficient compared to the technique shown in FIG. 2. In this method, no opposing wire will be allowed to have less than the minimum power 24 applied to it. Consequently, when one opposing wire reaches the minimum power 24, the power applied to the other opposing wire(s) will be increased to compensate for the fact that the power applied to a wire that has reached the minimum power 24 cannot be reduced further.

Returning to FIG. 5, the first state may comprise driving the opposed wires using a power that is close to the predefined minimum average power. Once in the opposing wires have entered the first state, the wires are maintained in the first state until instructions to move the moveable component are received.

The process continues at step S502 by receiving instructions to move the moveable component. The instructions may comprise data indicating where the moveable component is to be moved to, or this may be derivable from other data in the instructions. If the instructions indicate a large movement of the moveable component is required and/or that the moveable component is to be moved quickly, the power applied to at least one of the opposing wires needs to be increased in order to drive the movement. Thus, at step S504 the process comprises generating instructions to switch a first wire (or a first set of wires) into a second state, in which at least one of the opposing wires is driven with a higher power. The second state may be reached by supplying the first wire(s) with a power that is between the minimum and maximum average powers. More specifically, the second state may be reached by supplying the first wire(s) with a power that is between the mid-point and the maximum average power. Once the opposing wires have entered the second state, the wires are maintained in the second state until instructions to return the moveable component to the first state (i.e. the default 'hold' state) are received.

As explained above, in a pair or set of opposing wires, when the first wire (or first set of wires) is placed into a second higher power state, a second wire (or second set of wires) is powered using a lower power that cannot be lower than the predefined minimum average power. Therefore, at step S506, the method comprises determining whether the power of the second wire(s) is below the predefined minimum average power. If the power of the second wire(s) is below the predefined minimum average power, then the power supplied to the first wire(s) is decreased to enable the power of the second wire(s) to be increased above the predefined minimum average power. However, if at step S506 the power of the second wire(s) is above the predefined minimum average power, the power supplied to each of the opposing wires is maintained until instructions are received to revert to the first state (step S510).

Figure 6:
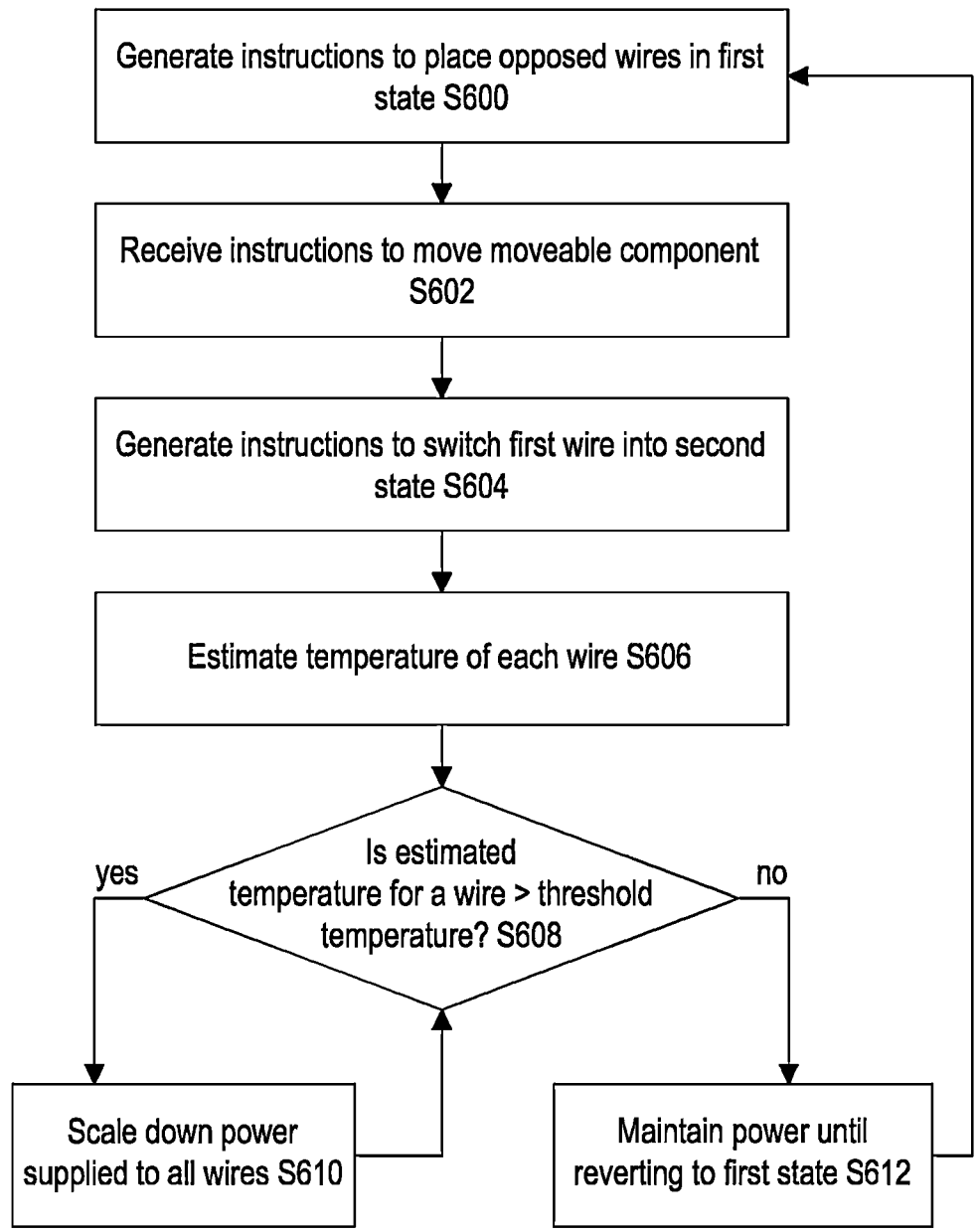
FIG. 6 shows a flowchart of example steps to drive an SMA actuator using a second technique.

FIG. 6 shows a flowchart of example steps to drive an SMA actuator using a second technique. The steps may be implemented by at least one processor used to control the SMA actuator, or may be implemented by control circuitry, or a combination of both. The process begins at step S600 by generating instructions to place the opposed wires into a first state. In this method, one or both of the minimum and maximum average powers can initially be ignored. Instead, an estimate of the temperature of each individual wire is made based on the history of power delivered to the wires and the ambient temperature. If the estimated wire temperature exceeds a safe limit (determined empirically), then a known safe maximum wire power limit is applied, as per the method described above with respect to FIG. 5. This allows larger powers to be applied to wires compared to the techniques shown in FIGS. 2 and 3. Consequently, greater rates of change of wire temperature and increased actuation speeds are possible.

Once the opposing wires have entered the first state, the wires are maintained in the first state until instructions to move the moveable component are received. The process continues at step S602 by receiving instructions to move the moveable component. The instructions may comprise data indicating where the moveable component is to be moved to, or this may be derivable from other data in the instructions. If the instructions indicate a large movement of the moveable component is required and/or that the moveable component is to be moved quickly, the power applied to at least one of the opposing wires needs to be increased in order to drive the movement. Thus, at step S604 the process comprises generating instructions to switch a first wire (or a first set of wires) into a second state, in which at least one of the opposing wires is driven with a higher power. Once the opposing wires have entered the second state, the wires are maintained in the second state until instructions to return the moveable component to the first state (i.e. the default 'hold' state) are received.

At step S606, the temperature of each wire is estimated (using the ambient temperature of the actuator and the history of power delivery to the wires). At step S608, the estimated temperature for a wire is compared to a predefined threshold temperature. If, for a given wire, the estimated temperature exceeds the threshold temperature then the power supplied to all the wires is scaled down such that the wire having an estimated temperature above the threshold temperature is now at a power that is known to be safe (step S610). The scaling ensures that the relative signals of all the opposing wires (i.e. in all controlled degrees of freedom) are scaled only and avoids any wire having a high tension. This technique is useful if, when the first wire (or first set of wires) has been, or is going to be, switched into a second state, the required power differential between the wire(s) receiving a higher power and the wire(s) receiving a lower power cannot be achieved without one or more wires receiving a negative power. That is, one or more wires may need to be physically cooled in order to achieve the required power differential to generate a required fast and/or large movement of the moveable component. Physical cooling may not be achievable, and therefore, the powers are scaled in order to retain the required power differential but without exceeding a known safe power or causing the wires to be at an undesirable high tension.

In some cases, scaling of the powers may not be desirable because, for example, it may cause the wire tension to be decreased to a point that prevents the moveable component to be reliably controlled. In this case, the power supplied to an opposing wire may be increased, as explained above with reference to FIG. 5. However, if at step S608 the power of the wire is below the threshold temperature, the power supplied to each of the opposing wires is maintained until instructions are received to revert to the first state (step S612).

Figure 7:
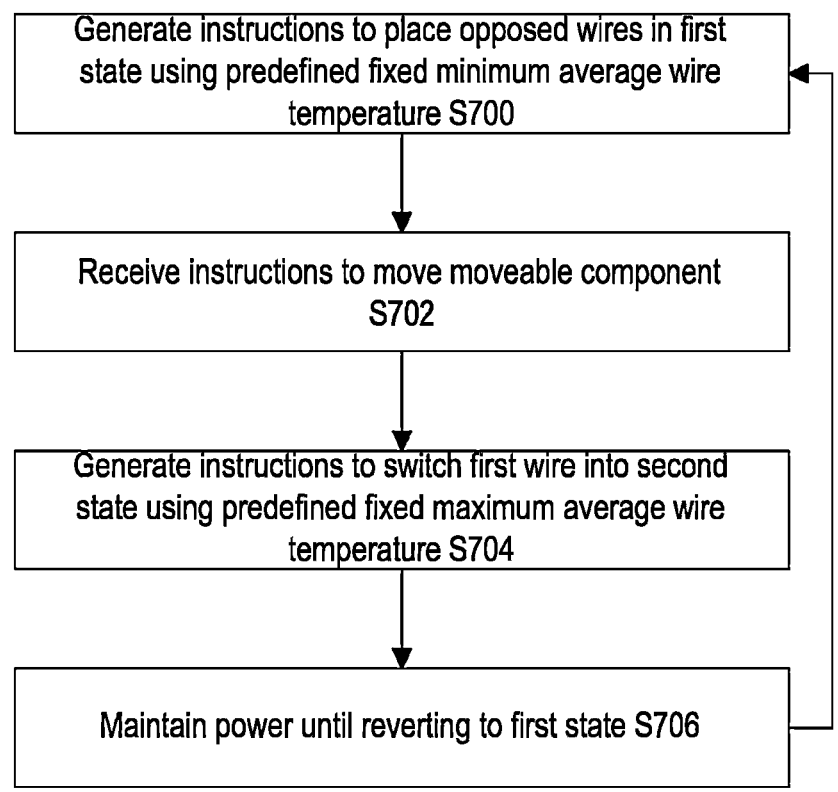
FIG. 7 shows a flowchart of example steps to drive an SMA actuator using a third technique.

FIG. 7 shows a flowchart of example steps to drive an SMA actuator using a third technique. The steps may be implemented by at least one processor used to control the SMA actuator, or may be implemented by control circuitry, or a combination of both. The process begins at step S700 by generating instructions to place the opposed wires into a first state using a predefined minimum average wire temperature (or power). The method comprises operating between two fixed wire temperatures (or powers): a minimum average temperature (or power) used to hold a position or when small, slow movements are required, and a maximum average temperature (or power) used to achieve larger or faster movements. The switching from the lower average temperature to higher average temperature may be triggered by any means. For example, where the SMA actuator is used to move an element of a camera, a change in the camera mode (e.g. from standby or camera preview mode, to a mode where an image or video is actually being captured) may trigger a switch between the lower power to the higher power. This switch can be triggered either by a specific deliberate signal, or by a controller identifying the need for increased power to achieve a given motion, position, acceleration or velocity.

Thus, placing the wires into the first state may comprise driving the opposed wires using a power that is substantially equal to the predefined minimum average power, or driving the opposed wires using a power that enables the wires to reach the predefined minimum average temperature. Once the opposing wires have entered the first state, the wires are maintained in the first state until instructions to move the moveable component are received.

The process continues at step S702 by receiving instructions to move the moveable component. The instructions may comprise data indicating where the moveable component is to be moved to, or this may be derivable from other data in the instructions. If the instructions indicate a large movement of the moveable component is required and/or that the moveable component is to be moved quickly, the power applied to at least one of the opposing wires needs to be increased in order to drive the movement. Thus, at step S704 the process comprises generating instructions to switch a first wire (or a first set of wires) into a second state, in which at least one of the opposing wires is driven with a higher power. The second state may be reached by supplying the first wire(s) with a power that is substantially equal to the predefined maximum average power, or driving the opposed wires using a power that enables the wires to reach the predefined maximum average temperature. Once the opposing wires have entered the second state, the wires are maintained in the second state until instructions to return the moveable component to the first state (i.e. the default 'hold' state) are received (step S706).

Each of the three techniques described above may be utilised in any actuator comprising opposing SMA wires.

It will be appreciated that there may be many other variations of the above-described embodiments.

For example, the wire temperatures can be modelled by applying a low pass filter to the drive signals.

The rate of change of the average drive signal and hence tension may be limited by drive signal windowing, or in response to a model of the actuator response (such as a low pass filter). Alternatively, the drive signal may be limited in its rate of change so as to limit the rate of change of average tension. A large rate of change of tension may be undesirable, for example if this causes an undesired position change that cannot be compensated for by adjusting a position demand.

Further embodiments of the present techniques are set out in the following numbered clauses:

i. A method of controlling opposed SMA actuator wires in an SMA actuation apparatus wherein at times when a high amplitude or high slew rate or high power differential is demanded, the average power applied to all the wires increases.

ii. The method of clause i wherein when the demanded amplitude or slew rate or power differential falls, the average power is reduced.

iii. A method of clause i wherein the maximum allowed power to the wires is determined by an estimate of the wire temperature.

1. A method for controlling opposed shape memory alloy (SMA) actuator wires in an actuation apparatus, where the opposed SMA actuator wires are connected between a static component and a moveable component in an arrangement in which the SMA actuator wires apply forces to the movable component in opposed directions, the method comprising:

generating instructions to control the average power of the opposed wires in a first low power state in which the opposed wires are at a first average temperature;

receiving instructions to move the moveable component; and generating instructions to increase the average power of the opposed wires and switch into a second higher power state in which the opposed wires are at a second average temperature, where the second average temperature is higher than the first average temperature.

2. The method of clause 1 wherein the step of generating instructions to control the average power of the opposed wires in a first low power state comprises generating instructions to drive the opposed wires using a fixed holding power.

3. The method of clause 2 wherein the step of generating instructions to increase the average power of at least one of the opposed wires comprises generating instructions to drive the at least one wire using a fixed operating power.

4. The method of clause 1 wherein the step of generating instructions to control the average power of the opposed wires in a first low power state comprises generating instructions to drive the opposed wires towards a predefined minimum average power.

5. The method of clause 4 wherein the step of generating instructions to increase the average power of at least one of the opposed wires comprises generating instructions to drive the at least one wire using a predefined maximum average power.

6. The method of clause 5 further comprising:
determining whether the power of an individual wire is below the predefined minimum average power; and
if so, decreasing the power supplied to one or more wires to enable the power to the individual wire to be increased above the predefined minimum average power.

7. The method of clause 1 further comprising estimating the temperature of each opposing wire.

8. The method of clause 7 wherein estimating the temperature comprises using a current ambient temperature value and a history of power delivered to the wire to generate the estimated temperature.

9. The method of clause 7 or 8 further comprising:
comparing the estimated temperature with a threshold temperature for an individual wire; and
if the estimated temperature is above the threshold temperature, scaling the power supplied to all of the opposing wires to enable the power to the individual wire to be decreased while maintaining a required power differential.

10. The method of clause 7 or 8 further comprising:
comparing the estimated temperature with a threshold temperature for an individual wire; and
if the estimated temperature is above the threshold temperature, increasing the power supplied to one or more wires to enable the power to the individual wire to be decreased.

11. An actuator comprising:
a static component;
a moveable component moveable relative to the static component;
at least two shape memory alloy (SMA) actuator wires connected to the static component and the moveable component in an arrangement in which the SMA actuator wires apply forces to the movable component in opposed directions; and
a controller, coupled to the at least two SMA actuator wires, for controlling the opposed SMA actuator wires by:
generating instructions to control the average power of the opposed wires in a first low power state in which the opposed wires are at a first average temperature;
receiving instructions to move the moveable component; and
generating instructions to increase the average power of at least one of the opposed wires and switch into a second higher power state in which the at least one opposed wire is at a second average temperature, where the second average temperature is higher than the first average temperature.

12. The actuator of clause 11 wherein the controller comprises control circuitry.

13. The actuator of clause 11 or 12 wherein the controller comprises at least one processor or microprocessor.

14. A non-transitory data carrier carrying processor control code to implement the method of any of clauses 1 to 10.

15. An apparatus comprising:
an actuator for moving a component of the apparatus, the actuator comprising:
a static component;
a moveable component moveable relative to the static component; and
at least two shape memory alloy (SMA) actuator wires connected to the static component and the moveable component in an arrangement in which the SMA actuator wires apply forces to the movable component in opposed directions; and
a controller, coupled to the actuator, for controlling the opposed SMA actuator wires by:
generating instructions to control the average power of the opposed wires in a first low power state in which the opposed wires are at a first average temperature;
receiving instructions to move the moveable component; and
generating instructions to increase the average power of at least one of the opposed wires and switch into a second higher power state in which the at least one opposed wire is at a second average temperature, where the second average temperature is higher than the first average temperature.

16. The apparatus of clause 15 wherein the apparatus is any one of: a smartphone, a mobile computing device, a laptop, a tablet computing device, a security system, a gaming system, an augmented reality system, a wearable device, a drone, a submersible vessel, an aircraft, a spacecraft, a vehicle and an autonomous vehicle.

The invention claimed is:

1. A method for controlling opposed shape memory alloy actuator wires that apply opposed forces to a moveable part, the method comprising:
carrying out control of at least an aspect of the configuration of the moveable part by driving each of the opposed wires, wherein the control is carried out with a particular average drive signal that is an average of drive signals to all of the opposed wires; and
increasing the average drive signal, thereby increasing the average power of the opposed wires, so as to increase a size of an allowable range of drive signals for at least one of the opposed wires.

2. A method according to claim 1 comprising:
carrying out the control with an average drive signal closer to the lower bound of the allowable range than to the upper bound of the allowable range; and
carrying out the control with an average drive signal that has been increased towards a midpoint of the allowable range.

3. A method according to claim 2 comprising carrying out the control in a low-power mode with an average drive signal that corresponds to a particular minimum average drive signal.

4. A method according to claim 1 comprising increasing the average drive signal in one or more particular conditions.

5. A method according to claim 4 wherein the one or more conditions correspond to:
a demand for a movement of the moveable part that requires differences between the drive signals that would otherwise reduce at least one of the drive signals below the lower bound of the allowable range of driving signals;

a demand for a high speed movement and/or a large movement of the moveable part;

a change from a holding mode to an operating mode; and/or a closed-loop control error.

6. A method according to claim 4 comprising decreasing the average drive signal when the one or more conditions no longer exist.

7. A method according to claim 1 comprising limiting a rate of change of the average drive signal.

8. A method according to claim 1 wherein the upper bound of the allowable range of drive signals is determined so as to protect against overheating of the at least one wire.

9. A method according to claim 8 wherein the upper bound is determined based on a maximum power that can be supplied to the at least one wire at a given ambient temperature.

10. A method according to claim 8 comprising estimating the temperature of the at least one wire.

11. A method according to claim 10 wherein the estimated wire temperature is based on a history of power supplied to the at least one wire.

12. A method according to claim 10 wherein carrying out the control comprises keeping the estimated wire temperature between upper and lower limits.

13. A method according to claim 12 comprising allowing the drive signal to the at least one wire to temporarily go above a maximum steady-state drive signal or go below a minimum stead-state drive signal.

14. A method according to claim 1 wherein the lower bound of the allowable range of drive signals is zero, or a relatively small drive signal, or a drive signal that maintains a suitable wire temperature for driving the at least one wire.

15. A method according to claim 1 wherein the average drive signal is changed as the ambient temperature changes.

16. A controller configured to perform a method according to claim 1.

17. A non-transitory data carrier carrying code for causing a controller to perform a method according to claim 1.

18. Apparatus comprising:

a moveable part;

opposed shape memory alloy actuator wires arranged to apply opposed forces to the moveable part; and a controller according to claim 16, wherein the controller is configured to control the opposed wires.

19. A method of controlling opposed SMA actuator wires in an SMA actuation apparatus wherein at times when a relatively high amplitude or relatively high slew rate or relatively high power differential is demanded, the average power applied to all the wires increases and at times when a relatively low amplitude or relatively low slew rate or relatively low power differential is demanded, the average power applied to all the wires decreases.

20. The method according to claim 19, wherein the average power provided to the opposed SMA actuator wires is increased to enable a rapid change in the position of a moveable part driven by the opposed SMA actuator wires.

* * * * *